(12) United States Patent
Mchugh et al.

(10) Patent No.: US 12,507,718 B2
(45) Date of Patent: Dec. 30, 2025

(54) CRISP AND HARD WHOLE OAT KERNEL SNACK

(71) Applicants: The United States of America, as represented by the Secretary of Agriculture, Washington, DC (US); POP OATS LLC, Albany, CA (US)

(72) Inventors: Tara H. Mchugh, Albany, CA (US); Zhongli Pan, El Macero, CA (US); Donald A. Olson, Isleton, CA (US); Marc Pfeiffer, Los Angeles, CA (US); Rodger Morris, Oakland, CA (US)

(73) Assignees: The United States of America, as represented by the Secretary of Agriculture, Washington, DC (US); POP OATS LLC, Albany (CA)

( * ) Notice: Subject to any disclaimer, the term of this patent is extended or adjusted under 35 U.S.C. 154(b) by 19 days.

(21) Appl. No.: 17/727,908

(22) Filed: Apr. 25, 2022

(65) Prior Publication Data
US 2022/0248726 A1     Aug. 11, 2022

Related U.S. Application Data

(62) Division of application No. 16/010,761, filed on Jun. 18, 2018, now Pat. No. 11,337,446.

(51) Int. Cl.
*A23L 7/148*     (2016.01)
*A23L 7/10*     (2016.01)

(52) U.S. Cl.
CPC .............. *A23L 7/148* (2016.08); *A23L 7/1975* (2016.08); *A23V 2002/00* (2013.01)

(58) Field of Classification Search
None
See application file for complete search history.

(56) References Cited

U.S. PATENT DOCUMENTS 4,939,346 A * 7/1990 Bailey ..................... F26B 3/30
                                                    432/106
9,307,781 B2 * 4/2016 Lonergan .............. A23L 33/105

OTHER PUBLICATIONS

Yang: published as CN103141754A on Jun. 12, 2013. (Year: 2013).*
Hu: The effects of steaming and roasting . . . ; Agricultural Sciences 2 (2011) 56-60. (Year: 2011).*

* cited by examiner

*Primary Examiner* — Patricia A George
(74) *Attorney, Agent, or Firm* — John Fado; Matthew Bussan

(57) ABSTRACT

A crisp and hard whole kernel oat snack product made by fully hydrating whole oat kernels (i.e. oat groats), and then gelatinizing the starch in the whole oat kernels using an infrared process. The gelatinized oats are then roasted in a hot air dryer. The resulting food product is measurably harder and crisper than other whole oat products currently available.

6 Claims, 6 Drawing Sheets

CRISP AND HARD WHOLE OAT KERNEL SNACK

CROSS-REFERENCE TO RELATED APPLICATIONS

This is a divisional/continuation of co-pending U.S. patent application Ser. No. 16/010,761, filed on Jun. 18, 2018, which is hereby incorporated by reference herein in its entirety.

FIELD OF THE INVENTION

The disclosed product and process relates to a method for making a crisp and hard, whole kernel oat snack. Specifically, the product and process relates to an infrared (IR) heat-based process for making a crisp and hard oat kernel snack.

BACKGROUND OF THE INVENTION

The relationship between food and health has an increasing impact on food innovation. Oats have well-known nutritional and health benefits (dating back to the 1800s), most recently (in 1997) earning the Food and Drug Administration's (FDA's) first approval for an allowed health claim related to a particular food product. Specifically, the FDA approved of a claim related to oats' soluble fiber content and its ability to help in reducing the risk of heart disease. Although oats comprise a healthy, natural cereal grain, there is an almost complete lack of healthy, on-the-go oat-based snacks that are currently available.

The need exists for a tasty whole oat product that is both nutritious and desirable to consumers. The inventors have discovered a novel three step process for making a uniquely textured whole kernel oat food product. In accordance with the process described herein, the oat groat (i.e. the complete oat kernel with the husk removed) is first soaked in water, then rapidly heated with an infrared (IR) heating source and finally roasted to produce a novel oat product that has unique crisp and hard texture not previously achievable.

SUMMARY OF THE INVENTION

This disclosure is directed to a crisp and hard whole oat kernel food product and a method of making the food product. Specifically, the product is made by soaking whole oat groat kernels in water for about 24 hours, and then heating the whole oat groat kernels with an infrared emitter until starch in the oat groat kernels is gelatinized. The gelatinized whole oat groat kernels are then roasted with a hot air blower.

DETAILED DESCRIPTION OF PREFERRED EMBODIMENTS

The inventors designated the food product described herein as "crisp and hard whole oat kernels". The crisp and hard whole oat kernels have a unique texture and a lightly roasted taste. For the purposes of this disclosure, "crisp and hard whole oat kernels" are defined as a food product having the key steps of (1) soaking whole oat kernels; (2) mixing the oats while they undergo an infrared (IR) heating process; and (3) further roasting the oats in a rotary hot air dryer for about 4 minutes at about 260° C. with a blower air speed of 6-15 m/s (preferably 11.6 m/s). The preferred embodiment of the crisp and hard whole oat kernel production process is generally described in FIG. 1. Essentially, in the preferred embodiment, the crisp and hard whole oat kernels have a crispness of between 600-700 kg/sec with a preferable range of 650-700 kg/sec, and a hardness of 230-300 kg force with a preferable range of 260-300 kg force.

Figure 1:
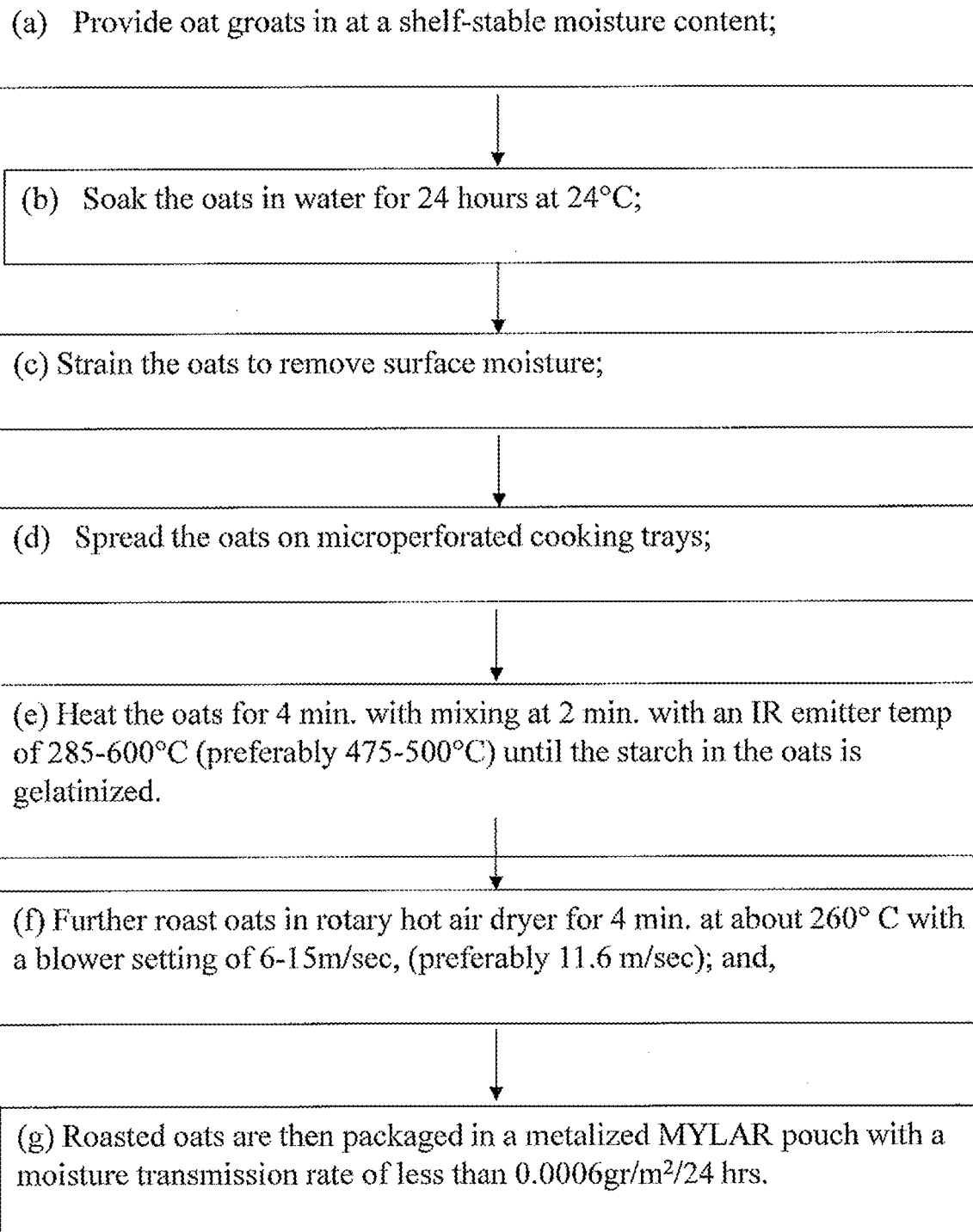
FIG. 1 is a flow chart showing the steps of the preferred embodiment of the current invention.

As described in FIG. 1 step (a), the process of making crisp and hard whole oat kernels begins with supplying "oat groats". Oat groats comprise the complete oat kernel with the husk removed and the oat kernel dried to a shelf stable moisture content. Oat groats are commercially available from several sources and are a common ingredient in the oat grain arts. The oat groats are initially soaked in fluid (preferably water) at a temperature of 4 to 25° C. for 18 to 70 hours. As indicated in FIG. 1 step (b), in the preferred embodiment, the oats are soaked at room temperature or 24° C. for 24 hours.

As generally described in FIG. 1 step (c), the soaked oats are then strained to remove surface moisture using a mesh with 5/64 inches or less opening. The oats will gain approximately 60-65% moisture, so one pound of oats will become 1.6-1.65 pounds of hydrated oats. These oats will have a moisture content of 40-45%. As described in step (d), the strained oats are spread on micro-perforated or solid stainless-steel trays in a thin layer ⅛ to ⅝ inch deep with a density range of 1.3-4.5 g/in$^2$, preferably a ⅜ inch thick layer at 3-3.8 g/in$^2$.

As further described in FIG. 1, step (e), the oats are then heated rapidly using electric IR or catalytic IR heaters with heat on both the top and the bottom of the trays. The catalytic emitters run at a gas flow rate of 1.2-2.23 m$^3$/hour, providing an emitter surface temperature of 285-520° C. The electric emitters are used at 11-28 watts/in$^2$ with a preferred intensity of 20 watts/in$^2$. The oats are heated from 3 minutes up to 8 minutes with one to two mixing steps in the heating process. The preferred heating is 4 minutes with mixing at 2 minutes and an emitter temperature of 475-500° C. The moisture content of these oats will range from 24-38%.

As described in FIG. 1, step (f), the gelatinized oats are then roasted in a rotary hot air dryer at temperatures ranging from 180° C. to 310° C. and roast times from 3 to 10 minutes with a blower (air flow) setting of 6-15 m/s. A preferred roast would be at 260° C. with a blower air speed of 11.6 m/s for 4 minutes of roasting time.

The roasted oats are then packaged in a metalized MYLAR pouch with a moisture transmission rate of less than 0.06 gr/100 in$^2$/24 hrs, preferably less than 0.0006 gr/100 in$^2$/24 hrs and an oxygen permeability of less than 0.03 cc/m$^2$/24 hrs. As described in step (g), in the preferred embodiment, the metalized MYLAR pouch preferably has an oxygen permeability 0.0006 cc/m$^2$/24 hrs. The package is nitrogen flushed and heat sealed for storage.

Process Steps

Some of the process steps will now be described in greater detail below.

Soak Time

The inventors discovered that a preliminary soaking of the unprocessed oat groats was required to produce the optimal final product. The maximum/optimal moisture content after soaking and straining the oats at ambient temperature and pressure was evaluated. To identify the optimal moisture content, the inventors soaked oat samples in water for varying lengths of time—including 14, 24, 36, and 67 hours at temperatures ranging from 4 to 25° C. Based on multiple assays, the inventors found that the moisture content of soaked oats leveled off at about 42% after 24 hours of soaking at room temperature, 24° C. Shorter soak times did not fully hydrate the oats and longer soak times did not significantly increase the moisture content of the oats and further increased the possibility of microbial contamination and product spoilage. An optimal soak time of 24 hours was selected based on full hydration of the oats and ease of production scheduling.

Gelatinization

Figure 2:
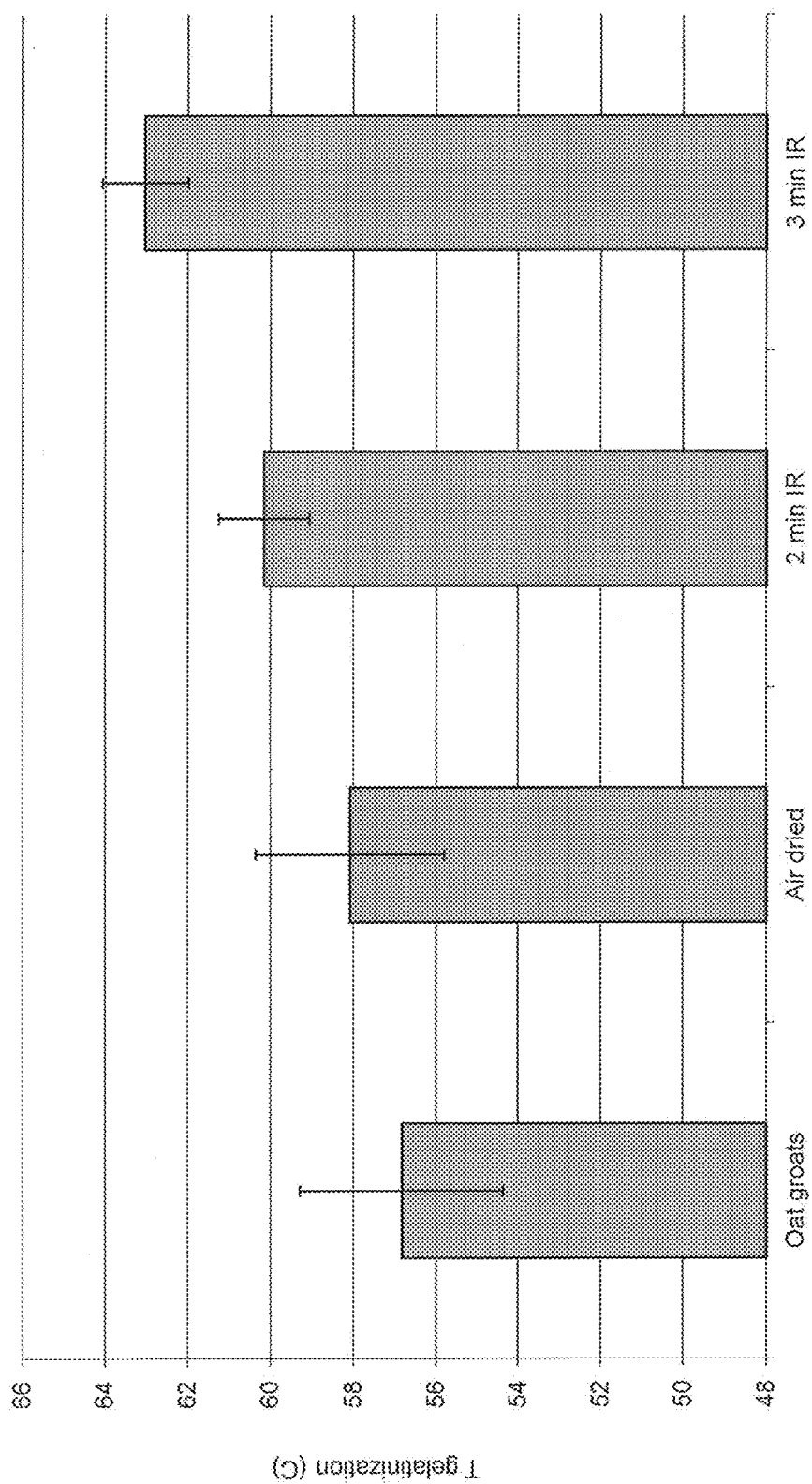
FIG. 2 is a bar chart showing the gelatinization temperature of starch in different oat products—as indicated by a differential scanning calorimeter (DSC)

The inventors also discovered that starch gelatinization is required to obtain the final product with the desired characteristics. This is a surprising and unexpected result. A Differential Scanning Calorimetry (DSC) was used to observe the starch gelatinization process as heating time is increased. Specifically, the DSC indicates the temperature and energy needed to gelatinize starch in the oat samples. FIG. 2 shows the temperature at which starch gelatinization occurs. Higher temperatures are needed to gelatinize the starch in samples that have less starch to gelatinize.

Figure 3:
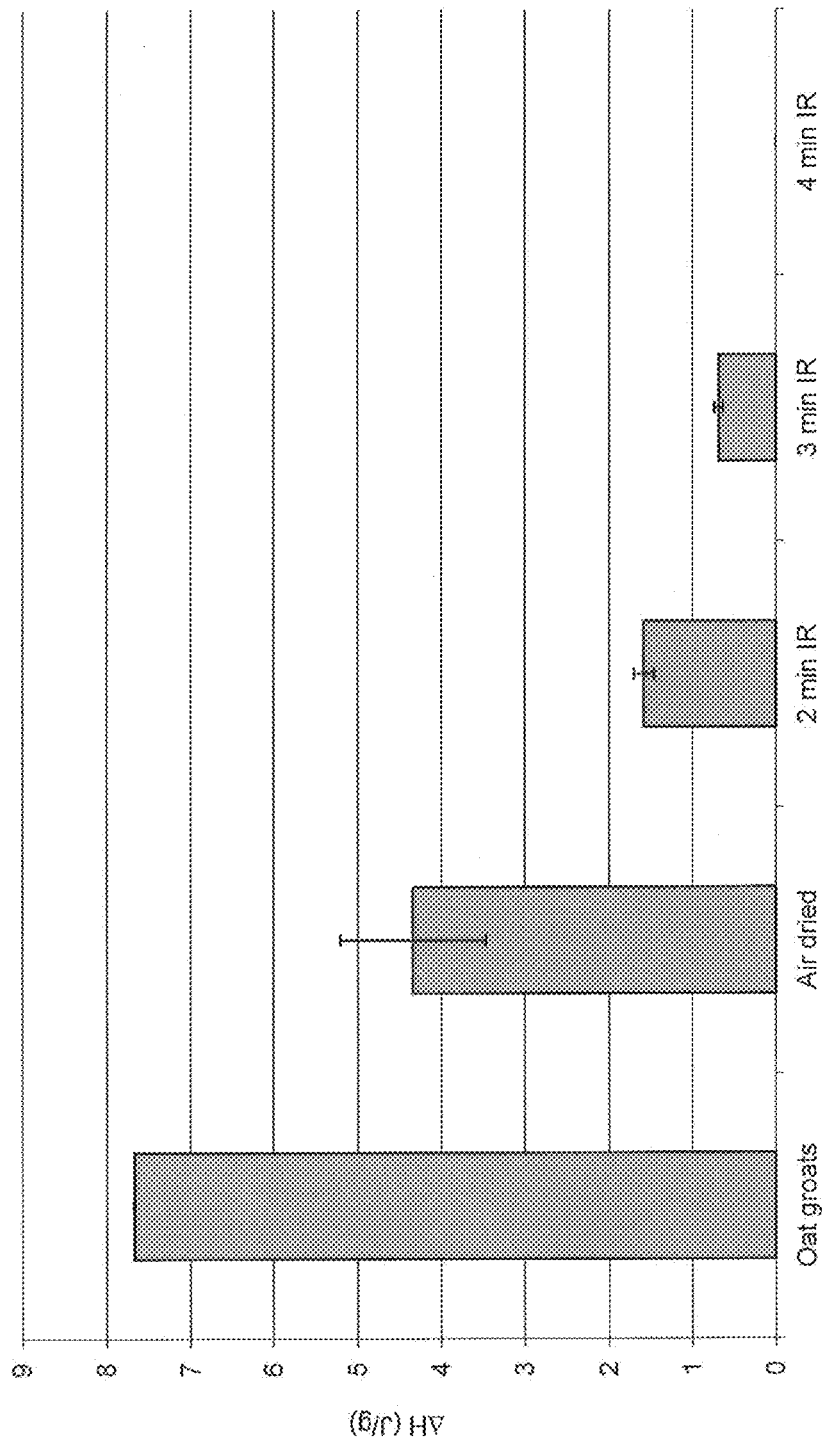
FIG. 3 shows the amount of energy needed to gelatinize any remaining starch in each oat sample. The 4 min IR sample has no remaining ungelatinized starch and is fully gelatinized.
Figure 4:
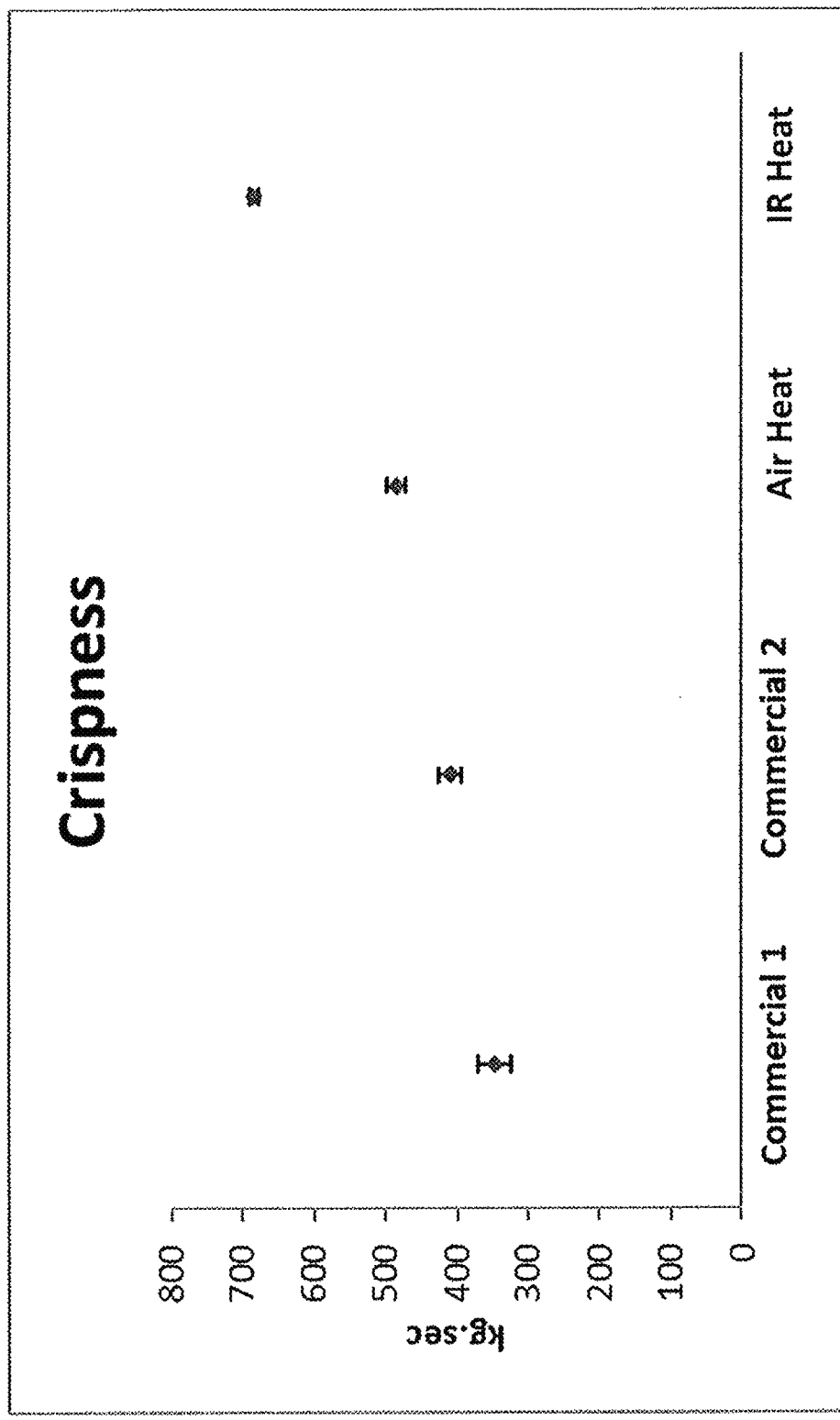
FIG. 4 is a graph comparing the crispness of a variety of oat products: two typical commercial products, one hot air pre-dried sample and the product of our invention (IR Dry). Error bars indicate the standard deviation of the crispness values for each sample.
Figure 5:
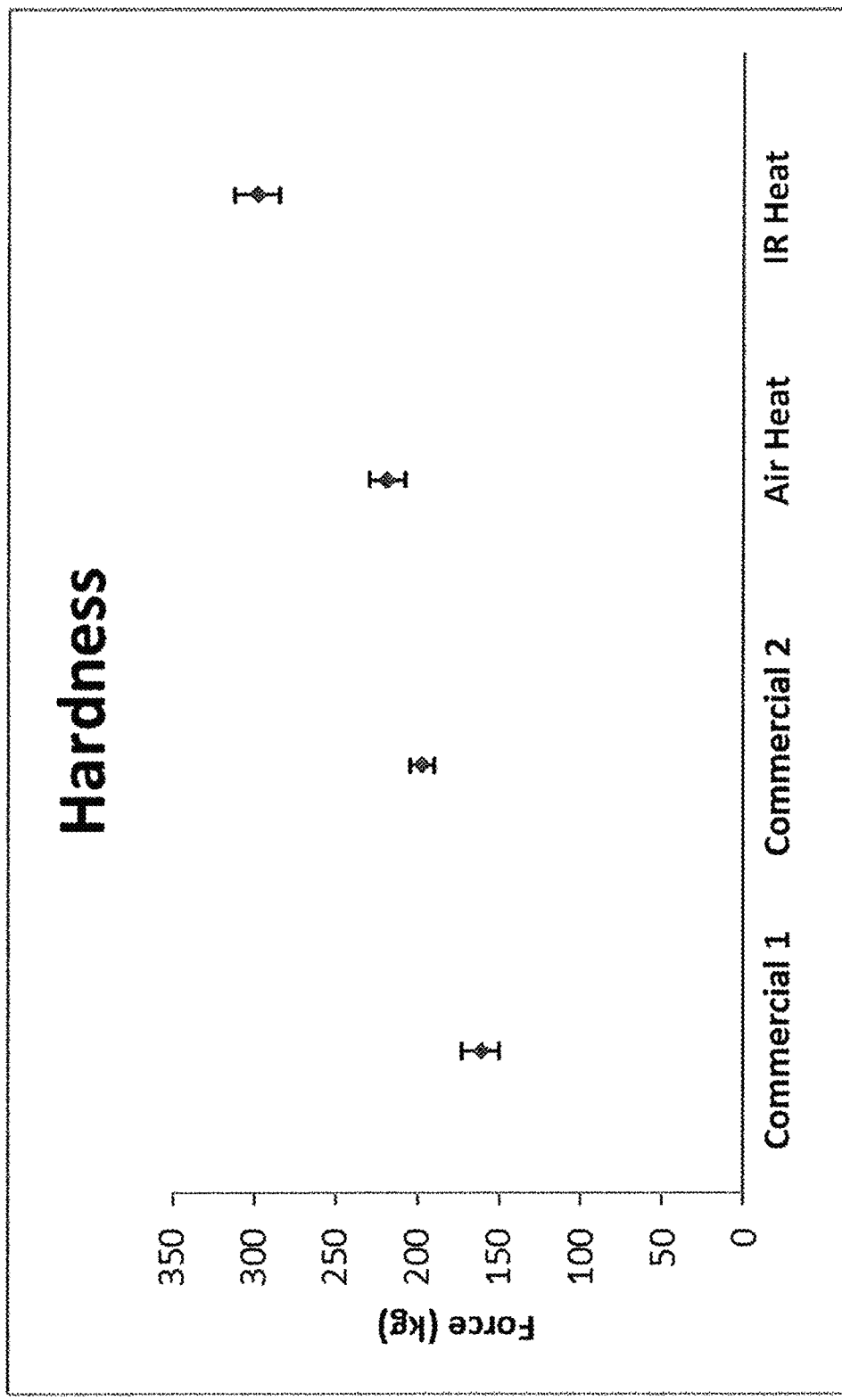
FIG. 5 is a graph showing comparing the hardness of a variety of oat products: two typical commercial products, one hot air pre-dried sample and the product of our invention (IR Dry). Error bars indicate the standard deviation of the hardness values for each sample; and, FIG. 6 is a flow diagram showing the process of making crisp and hard whole oat kernel clusters.

FIG. 3 shows the amount of energy used to gelatinize the remaining starch in each sample. You can see the energy needed decreases with the gelatinization level ending in the 4 minute IR sample that has no starch left to gelatinize. When a sample is fully gelatinized there is no energy peak. The IR emitters run at temperatures up to 600° C. The high temperatures allow rapid heating of the starch in the oats, gelatinizing the starch before it dries out. The hot air sample dries the starch out before it has a chance to fully gelatinize. Once gelatinized, the starch allows quick puffing of the oat kernels thereby producing an expanded crunchy texture. The DSC test process allowed the inventors to confirm that the IR sample was fully gelatinized at 4 minutes, while the hot air sample did not fully gelatinize—thereby demonstrating the unique and surprising benefit of using IR heating to fully gelatinize the starch in an oat-based food product. Significantly, none of the commercially available oat samples, nor the hot air-dried sample, produced the high degree of crispness and hardness shown in the samples produced using IR-based processes described by the inventors, as shown in FIG. 4 and FIG. 5.

Flavoring

In the simplest and most straight-forward embodiment, the crunchy oat kernels are flavored by adding 1-4% (by weight) oil. Any food oil can be used including but not limited to: corn, soy, sunflower, canola or grapeseed oil. The oats are thoroughly mixed with the oil to provide a binder for further flavoring ingredients. The actual mixing may be done by hand, or through a mechanical mixing system/apparatus, or by any means known in the art.

The flavoring is then added so that the flavoring comprises about 2-8% by weight of the oats. The flavoring is mixed into the oats by hand, or through a mechanical mixing system/apparatus, or by any means known in the art. The flavored oats are then packaged in a metalized MYLAR pouch with a moisture transmission rate of less than 0.06 gr/100 in$^2$/24 hrs preferably 0.0006 gr/100 in$^2$/24 hrs and an oxygen permeability of less than 0.03 cc/m$^2$/24 hrs, preferably a permeability 0.0006 cc/m$^2$/24 hrs. The package is nitrogen flushed and heat sealed for storage.

Texture

A texture analysis was conducted using two commercial oat products, one hot air-dried oat product, and the product described herein. Hot air drying is the common, conventional method for commercially drying oats. In FIGS. 4 and 5, California Cereals oats are designated as "Commercial 1", and Ancient Grains oats are designated as "Commercial 2".

FIG. 4 shows the results of a "Crispness" texture analysis on a TA.XT2-plus texture analyzer. The Crispness analysis was done using a back-extrusion setup with a 500 kg load cell, a 25 g sample, and a plunger set at 5 mm/min and compressed 50%. Crispness is a combination force and time (kg/sec). The test seeks to duplicate a consumer fully biting down on a crunchy item that fractures several times as you bite down.

FIG. 5 shows the results of a "Hardness" texture analysis conducted on a TA.XT2-plus texture analyzer. The analysis was done using a back-extrusion setup with a 500 kg load cell, 25 g sample, plunger set at 5 mm/min and compressed 50%. The hardness of a sample is defined by the first break that occurs when pressure is applied to a sample. The TAXT2 measures this in force (kg). Hardness is representative of the force you apply with your jaw that gives the first snap when you bite into a crunchy item.

FIGS. 4 and 5 show that the IR treated samples with starch fully gelatinized provide the most crisp and hard samples. IR treated samples were significantly crisper and harder than the commercial samples and the hot air-dried samples. An evaluation of under roasted and over roasted samples (not shown) demonstrated that under roasting does not produce a crisp sample, while over roasting produces a crisp sample, but it leaves the consumer with a burnt taste in his mouth. FIGS. 4 and 5 also show that pre-drying the samples with hot air slightly enhances product hardness and the crispness, but using an IR Dry treatment significantly improves both the hardness and crispness of the sample above that achievable through any other method.

Table 1 shows a summation of the key crispness and hardness data.

TABLE 1

| Product | Crisp and Hard Whole Oat Kernels (as described herein) | Commercial 1 California Cereal | Commercial 2 Ancient Grains |
|---|---|---|---|
| Crispness (kilograms force per/sec, per TA.XT-2plus) | 684 | 347 | 409 |

TABLE 1-continued

| Product | Crisp and Hard Whole Oat Kernels (as described herein) | Commercial 1 California Cereal | Commercial 2 Ancient Grains |
|---|---|---|---|
| Hardness (kilograms force, per TA.XT-2plus) | 298 | 161 | 197 |

Electric and Catalytic IR Emitters

Electric IR emitters use only electricity to produce the heat. Electric IR has very quick response to control setting changes and the emitter can get to full temperature a few minutes. Electric IR is a medium wavelength IR that is well suited for heating water or materials like most foodstuffs that start with high water content before drying. Water absorbs IR well at 3, 4.5 and 6 μm, the electric IR heats in the 3 μm range.

Gas catalytic IR uses a platinum catalyst with natural gas and oxygen creating an oxidation reduction reaction that produces IR heat. It requires electric preheating to start the reaction (about 20 minute warm up). Catalytic IR is in the long IR wavelength that has bands (4.5 and 6 μm) suited for heating water, the peak for water is not quite as efficient as electric IR, but very close. The main advantage of gas IR is energy efficiency. Gas catalytic IR is about 5 times more energy efficient than electric IR.

Gas Catalytic IR Process for Crisp and Hard Whole Oat Kernels

1. Oat groat is soaked in ample water at room temperature for 24 hours.
2. Soaked oats are drained in large strainer (5/64 inch hole diameter on strainer) to remove excess moisture.
3. The strained oats are spread at 3.5 g/in2 on solid stainless steel trays.
4. Trays are rapidly heated using catalytic gas IR heaters at a gas flow rate of 1.8 m3/hour with heat on both top and bottom of trays. The trays are heated for 4 minutes with mixing of the oats at the 2 minute mark.
5. Oats are roasted in a rotary dryer at 260° C. for 4 minutes at an air flow rate of 11.6 m/s.
7. Oats are packaged in metalized MYLAR for storage.

Electric Catalytic IR Process for Crisp and Hard Whole Oat Kernels

1. Oat groat is soaked in ample water at room temperature for 24 hours.
2. Soaked oats are drained in large strainer (5/64 inch hole diameter on strainer) to remove excess moisture.
3. The strained oats are spread at 0.5 g/in2 onto a TEFLON mesh conveyor belt.
4. Trays are rapidly heated using electric IR heaters at 19.6 watts/in2 with heat on both top and bottom of the belting. The IR heat exposure is for 4 minutes.
5. Oats are roasted on the same continuous TEFLON mesh belt at 200° C. for 13 minutes.
6. Oats are packaged in metalized MYLAR for storage.

Oat Clusters

Figure 6:
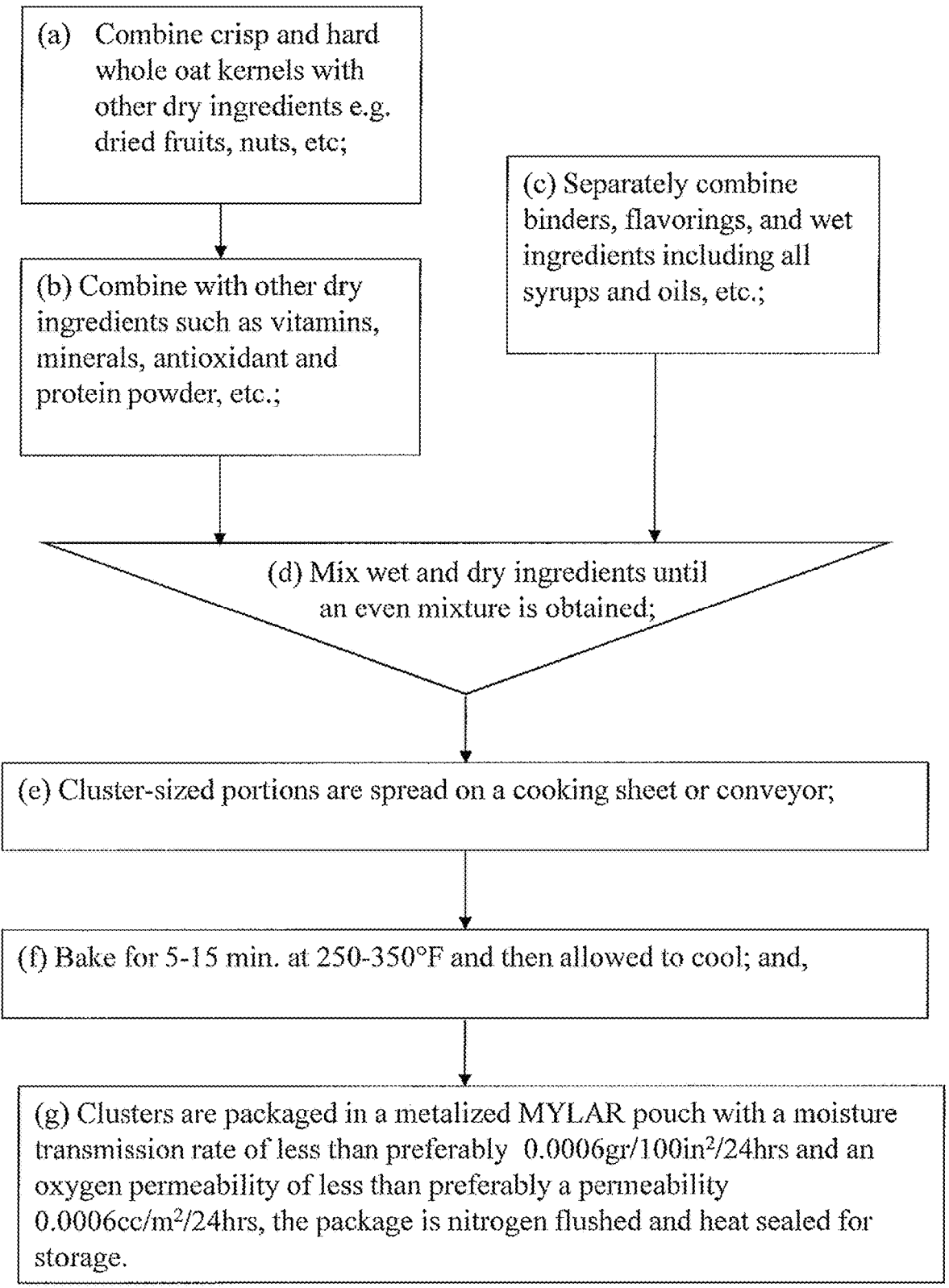

The crisp and hard whole oat kernels described above can continue to be processed as clusters—which may incorporate multiple additional ingredients. FIG. 6 generally describes a means. At the start of the oat cluster preparation process (as shown in FIG. 6, step (a)), the crisp and hard whole oat kernels are weighed and put into a bowl or mixer where other dry ingredients including but not limited to fruits, nuts, chocolate, pretzels or other bits and pieces are added. Other dry nutritional ingredients may also be added, including but not limited to vitamins, minerals, antioxidant powders, protein powders and fibers, as described in step (b).

As described in FIG. 6 step (c), in a secondary container, all binders and wet ingredients are mixed including but not limited to rice syrups, honey, molasses, maple syrup, oils, and other generally liquid flavorings. In step (d), the dry materials from steps (a) and (b) are mixed with the "wet" ingredients from step (c) until an even mixture is obtained.

The "cluster" mix is spread in drops or as a sheet on baking pans or it is extruded onto a conveyor for baking, as described in FIG. 6 step (e). Per step (f), the cluster drops, sheet, or extrusion is then baked in an oven at a temperature of 0-450° F. (preferably 250-350° F.) for 0-35 minutes (preferably 5-15 minutes). The clusters are then allowed to cool, and the sheeted mix and/or extrusion is cut into clusters as required.

As described in FIG. 6 step (g), the clusters are packaged in a metalized MYLAR pouch with a moisture transmission rate of less than 0.06 gr/100 in$^2$/24 hrs preferably 0.0006 gr/100 in$^2$/24 hrs and an oxygen permeability of less than 0.03 cc/m$^2$/24 hrs, preferably a permeability 0.0006 cc/m$^2$/24 hrs. The package is nitrogen flushed and heat sealed for storage.

Fruit and Nut Mix for Crisp and Hard Whole Oat Kernels Examples 1. 135 g Crisp and hard whole oat kernels are put into a mixing bowl.
2. 112 g roasted almonds are added to the oats.
3. 220 g of dates are processed in a food processor to make a thick paste. The paste is added to the oats and almonds.
4. 84 g maple syrup is heated in a saucepan with 64 g almond butter.
5. The hot maple nut mixture is poured over and mixed into the crisp and hard whole oat kernels, roasted almonds and dates.
6. The mixture is spread on a baking sheet then cooled under refrigerated conditions for 20 minutes.
7. The solidified sheet is cut into clusters of 1×1 inches.
8. The clusters are placed into PACVF4 metalized MYLAR bags purchased from sorbent systems. The bags are nitrogen flushed and sealed.

Oat Chocolate Cluster 1. 1000 g of dark chocolate is brought to a melting temperature of 93 F.
2. 1000 g crisp and hard whole oat kernels is mixed into the 1000 g chocolate.
3. The oat chocolate mixture is spread on baking sheet at ½ in thickness.
4. The sheets are cooled 1 hour under refrigeration to solidify.
5. The set chocolate is cut into 1" clusters.
6. Clusters are package in a PACVF4 metalized mylar bags purchased from sorbent systems. The bags are nitrogen flushed and sealed.

For the foregoing reasons, it is clear that the crisp and hard whole oat kernels described herein provide an innovative and nutritious oat snack that taste good by itself, but also can be used as a base material in other food product applications. The current product and method may be modified in multiple ways and applied to achieve varying results. The disclosed method and product described herein may be modified and customized as required to achieve a specific taste result.

The amounts, percentages and ranges disclosed herein are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Similarly, if the term "about" precedes a numerically quantifiable measurement, that measurement is assumed to vary by as much as 10%. Essentially, as used herein, the term "about" refers to a quantity, level, value, or amount that varies by as much 10% to a reference quantity, level, value, or amount.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein.

The invention claimed is:

1. An edible whole oat kernel, consisting of:
   puffed whole oat groat kernels;
   a crispness of about 600-700 kg/sec; and
   a hardness of about 230-300 kg force.

2. The edible whole oat kernel product of claim 1, is produced by a method comprising:
   (a) soaking whole oat groat kernels in a fluid for about at least about 18-70 hours to achieve a moisture content of about 40-45%;
   (b) straining the whole oat groat kernels to remove excess surface moisture;
   (c) heating the whole oat groat kernels with an infrared emitter at about 285-600° C. until starch in the whole oat groat kernels is gelatinized; and
   (d) roasting the gelatinized whole oat groat kernels with a hot air blower until the whole oat groat kernel product attains a crispness of between about 600-700 kg/sec and a hardness of about 230-300 kg force.

3. A food product, comprising:
   an edible whole oat kernel, consisting of:
   puffed whole oat groat kernels;
   a crispness of about 600-700 kg/sec; and
   a hardness of about 230-300 kg force.

4. The food product of claim 3, further comprising:
   flavoring and food oil, wherein the food oil binds the flavoring to the puffed whole oat groat kernels, wherein the flavoring comprises 2-8% by weight of the product; and
   one or more further ingredients selected from the group consisting of fruits, nuts, chocolate, pretzels, vitamins, minerals, antioxidant powders, protein powders, and protein fibers, rice syrup, honey, molasses, maple syrup;
   wherein the food product comprises oat clusters.

5. The food product of claim 3, further comprising: roasted almonds, date paste, maple syrup, and almond butter; wherein the food product comprises a fruit and nut mix oat cluster.

6. The food product of claim 3, further comprising: chocolate; wherein the food product comprises oat chocolate clusters.

* * * * *